No. 613,770. Patented Nov. 8, 1898.
O. LOCKE.
KITCHEN CABINET.
(Application filed Nov. 10, 1897.)
(No Model.) 2 Sheets—Sheet 2.
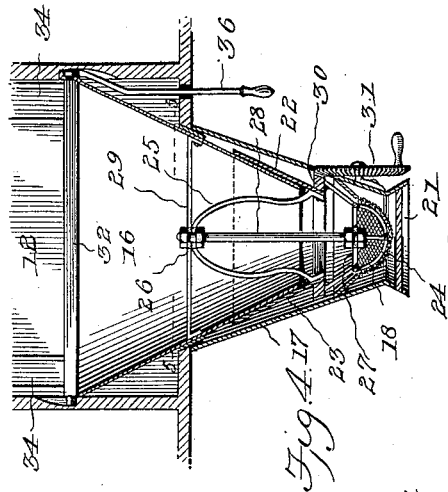
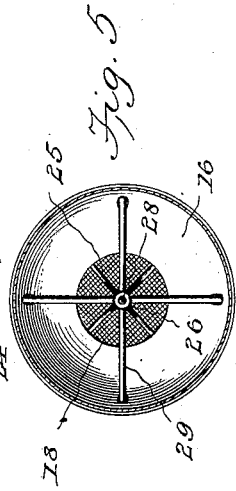
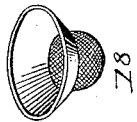
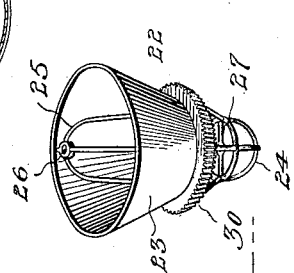
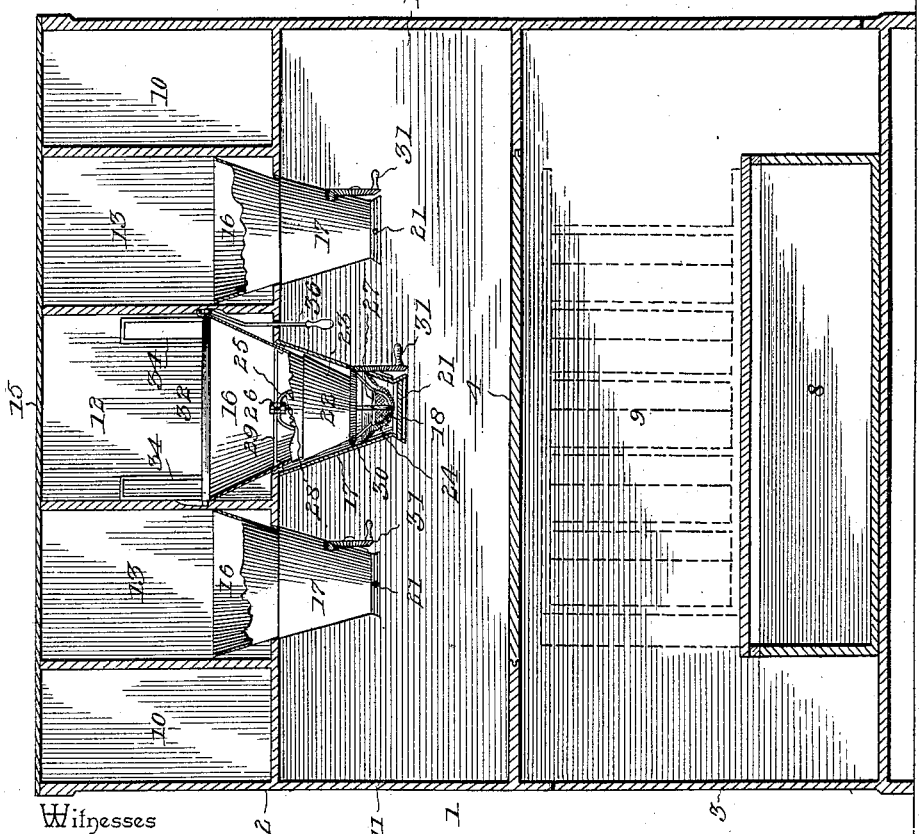
Witnesses
Inventor
Orella Locke,
By her Attorneys,
C. A. Snow & Co.

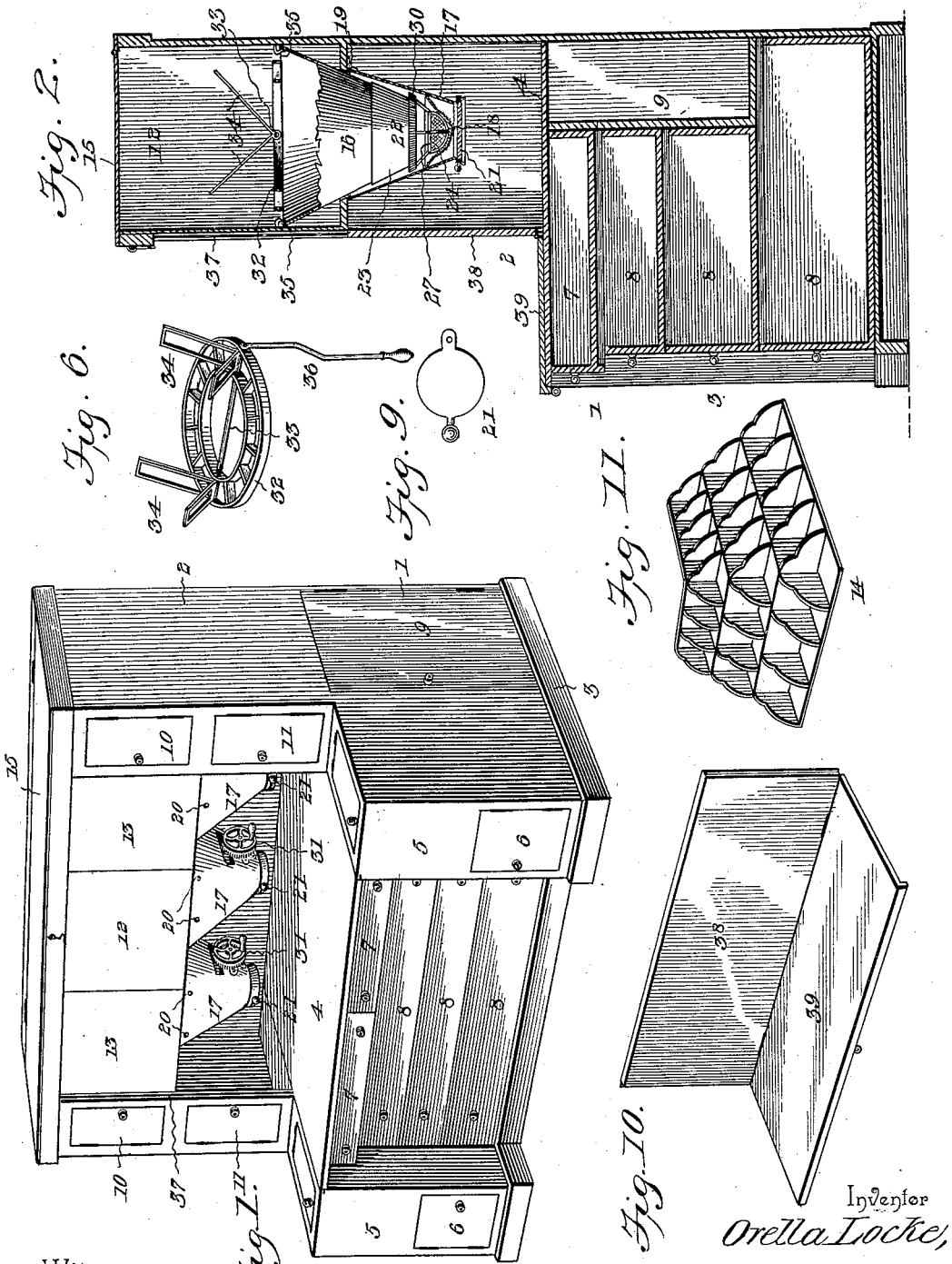

UNITED STATES PATENT OFFICE.

ORELLA LOCKE, OF CANYON, COLORADO.

KITCHEN-CABINET.

SPECIFICATION forming part of Letters Patent No. 613,770, dated November 8, 1898.

Application filed November 10, 1897. Serial No. 658,039. (No model.)

*To all whom it may concern:*

Be it known that I, ORELLA LOCKE, a citizen of the United States, residing at Canyon city, in the county of Fremont and State of Colorado, have invented a new and useful Kitchen-Cabinet, of which the following is a specification.

The invention relates to improvements in kitchen-cabinets.

The object of the present invention is to improve the construction of kitchen-cabinets and to provide a simple and comparatively inexpensive one which will be provided with conveniently-arranged compartments and receptacles for utensils and materials necessary for the preparation of food and which will be capable of thoroughly sifting flour, meal, and similar material and of preventing the same from becoming lodged in any portion of the bins or sifters.

The invention consists in the construction and novel combination and arrangement of parts hereinafter fully described, illustrated in the accompanying drawings, and pointed out in the claims hereto appended.

In the drawings, Figure 1 is a perspective view of a kitchen-cabinet constructed in accordance with this invention, the sliding door being removed. Fig. 2 is a vertical sectional view, the section being taken from front to rear and the sliding door being down. Fig. 3 is a transverse sectional view. Fig. 4 is an enlarged vertical sectional view of the lower portion of one of the bins, illustrating the construction and arrangement of the flour-stirring appliance and the agitator. Fig. 5 is a horizontal sectional view on the line 5 5 of Fig. 4. Fig. 6 is a detail perspective view of the agitator. Fig. 7 is a similar view of a flour-stirring device. Fig. 8 is a detail view of the sieve. Fig. 9 is a detail view of the pivoted cut-off. Fig. 10 is a detail view of the sliding door and the hinged leaf which forms a cover for the pastry-board. Fig. 11 is a detail view of the bracket for supporting bottles and canisters.

Like numerals of reference designate corresponding parts in all the figures of the drawings.

1 designates a kitchen-cabinet comprising an upper portion 2 and a lower portion 3, which is extended in advance of the upper portion to provide a convenient table or support for the preparation of pastry and other food, and a centrally-arranged pastry-board 4 is mounted at the top of the lower portion 3 in suitable ways and is adapted to be drawn outward to the desired extent. The lower portion of the cabinet is provided with upper side bins or compartments 5 and lower compartments 6, and it has a series of drawers 7 and 8, located between the compartments 5 and 6 and arranged as shown, the lower drawers being offset rearward from the upper drawers 7 and the latter being arranged in rear of the front faces of the compartments 5 and 6. The side bins 5 are provided with hinged lids located in the same plane as the pastry-board, and the lower compartments 6 are provided with hinged doors. The space in rear of the drawers and the compartments 5 and 6 is adapted for housing a step-ladder and kitchen utensils, and doors 9 are provided at opposite sides of the lower portion of the cabinet to permit the step-ladder to be removed and replaced. The stepladder is designed to be used when filling the flour and meal bins hereinafter described.

The upper portion of the cabinet is provided at opposite sides with upper and lower compartments 10 and 11, and in the space between these compartments 10 and 11 are located bins 12 and 13 for flour, meal, and similar material. The compartments 10 and 11 form convenient receptacles for various substances employed in the preparation of food, and they may be divided by partitions or shelves, and in one of them the bracket 14 is designed to be located. The bracket 14, which is tapering, as shown, and which is designed for conveniently holding bottles, canisters, and the like, consists of a series of tiers or shelves and vertical partitions, which are also tapering, as shown.

The bins 12 and 13 are similar in construction, with the exception that the former is of greater size than the latter, and the top 15 of the cabinet is hinged and forms a cover for all the bins. Each bin, which is provided with a rectangular upper portion or body, has a depending tapering portion or section 16, which is connected with the rectangular upper portion or body at a point above the lower edges thereof and which is circular in horizontal section at its lower portion. The tapering lower section 16 is received within a tapering outer casing 17, which carries a sieve 18 and which is hinged at the back at 19 to enable it to be swung downward for exposing the sieve. The front of the casing 17 is secured to the body portion of the bin by a suitable catch 20, and a pivoted cut-off 21 is arranged at the bottom of the casing to prevent the discharge of flour or other material. The pivoted cut-off is maintained in its closed position by any suitable form of fastening device.

The sieve 18, which may be readily removed from the casing 17, is provided at its upper edge with a metal band, and it receives the lower portion of a flour-stirring appliance 22, mounted for horizontal rotation at the bottom of the tapering portion 16 of the bin. The flour-stirring appliance comprises a conical or tapering body 23, depending stirrer-arms 24, and upwardly-converging arms 25, which are provided at their upper terminals with a bearing 26. The upper portion of the conical body 23 receives the lower end of the tapering portion 16 of the bin, the arms 25 extending upward into the same, and the depending stirrer-arms 24 are curved to conform to the configuration of the sieve and extend into and operate on the inner face of the same. The stirring appliance is provided at the upper terminals of the stirrer-arms with a horizontal bar 27, having an eye or opening for the reception of a vertical rod or bolt 28, passing through the bearing 26 and secured to a supporting spider or frame 29 of the bin, whereby the stirring appliance is rotatively mounted thereon. The supporting spider or frame is composed of horizontal bars or arms extending radially from a central eye or opening and secured to the lower tapering portion 16 of the bin.

A cog-ring 30 is arranged on the exterior of the conical body 23 and meshes with a cog-wheel 31, which is mounted on the outer casing 17 and is provided with a handle for rotating the stirring appliance. The cog-wheel, which extends through an opening of the casing 17, is mounted upon the same in any manner, and the bolt or rod which forms a shaft for the flour-stirring appliance is rigidly secured to the spider or frame by suitable nuts. By extending the arms 25 into the tapering portion 16 of the flour-bin the stirring device performs two functions—stirring the flour from the tapering portion 16 and rubbing it through the sieve.

In order to prevent the material from lodging in the upper portion of the body of the bin, an oscillating agitator 32 is provided and is arranged at the upper edges of the tapering portion 16. The agitator 32, which is mounted on a horizontal shaft 33, is circular in order to conform to the general configuration of the tapering bottom portion, and it is provided with upwardly-diverging arms 34, arranged in pairs at the ends of the shaft 33 and adapted when the agitator is oscillated to strike metal plates 35. The metal plates 35, which are located at the upper edges of the tapering portion 16, are disposed at the front and back of the bin, and the shaft 33 is provided at one end with a depending handle 36, by which the agitator is oscillated. The arms 34 limit the oscillation of the agitator, which displaces the flour or similar material resting on the inclined sides of the lower portion 16 of the bin. The arms also prevent flour from lodging at the corners of the rectangular upper portion of the bin.

The upper portion of the kitchen-cabinet is provided at opposite sides with ways 37, in which is arranged a sliding door 38, adapted to cover the lower portions of the bins and conceal the operating mechanism. The door 38 slides in the ways, which are provided with suitable rollers or pulleys, and a leaf 39 is hinged to the lower edge of the door 38 to provide a cover for the outer portion of the pastry-board. The leaf 39 is adapted to be swung up against the sliding door and to be raised with the same, it being held in such position by a suitable catch.

The invention has the following advantages: The kitchen-cabinet is simple and comparatively inexpensive in construction and is adapted to hold in convenient position various utensils and materials employed in making pastry and other food, and the sifting and agitating devices are adapted to prevent flour and similar material from lodging in the upper or lower portions of the bins. The exteriorly-disposed cog-wheel is arranged in convenient position and the handle of the agitator may be readily grasped and easily oscillated. Each sieve is detachably mounted in its outer casing, which is hinged to the upper portion or body of the bin and which is adapted to be readily swung downward to afford access to the sieve.

Changes in the form, proportion, and minor details of construction may be resorted to without departing from the spirit or sacrificing the advantages of this invention.

Having thus fully described the invention, what is claimed as new, and desired to be secured by Letters Patent, is—

1. In a kitchen-cabinet, the combination of a bin, a tapering outer casing hinged at one side of the bin and adapted to swing downward, a sieve arranged within the lower portion of the casing and located a considerable distance below the lower end of the bin, said sieve being provided with a tapering band fitting against the walls of the casing and detachably supporting the sieve therein, a vertical shaft mounted within the bin and depending below the same, the upper stirring-arms mounted on the shaft at the upper end thereof and depending therefrom and operating within the bin, and the lower stirring-arms connected with the lower end of the shaft and with the lower terminals of the upper arms and operating within the sieve, substantially as described.

2. In a kitchen-cabinet, the combination of a bin, an outer casing receiving the lower portion of the bin, a rotary stirring device journaled on the bin and provided with two separate sets of arms, one set being arranged within the bin and the other set extending downward and arranged within the casing, a horizontal cog-wheel located within the casing and mounted on the exterior of the stirring device, a hand-operated cog-wheel mounted on the exterior of the casing and extending through the same and meshing with the horizontal cog-wheel, and a sieve arranged within the casing and receiving the lower or downwardly-extending arms of the stirring device, substantially as described.

3. In a kitchen-cabinet, the combination of a bin having a tapering lower portion, a tapering outer casing provided with a sieve, and a rotary stirring device, comprising a tapering body receiving the lower tapering portion of the bin, the depending stirrer-arms arranged on the sieve and carried by the body, and the upwardly-extending converging arms mounted on the tapering body and extending into the bin and provided at their adjacent ends with a bearing, substantially as described.

4. In a kitchen-cabinet, the combination of a bin, a horizontal shaft 33, a frame journaled on the shaft, the upwardly-diverging arms arranged at an angle to the frame and extending from the center thereof laterally of the same, whereby they are adapted to strike the walls of the bin and limit the oscillation of the frame and dislodge flour, and means for operating the shaft, substantially as described.

5. In a kitchen-cabinet, the combination of a bin, a horizontal shaft 33, an oscillating agitator mounted on the shaft and consisting of a flat circular frame arranged within the bin, arms extending upward from the frame and arranged to strike the walls of the bin for limiting the swing of the agitator, and means for oscillating the shaft 33, substantially as described.

6. In a kitchen-cabinet, the combination of a bin having a tapering lower portion, an outer casing provided with a sieve, a rotary stirring device comprising a tapering body arranged on the lower portion of the bin and receiving the same, the depending stirring-arms located below the tapering body and arranged on the sieve, the upwardly-extending arms carried by the tapering body and projecting into the bin, a horizontal cog-ring mounted on the tapering body at the outer face thereof and located within the casing, and a cog-wheel mounted on the exterior of the casing and meshing with the cog-ring, substantially as described.

7. In a kitchen-cabinet, the combination of a bin having a tapering lower portion, a supporting frame or spider 29 mounted within the same, a casing receiving the lower portion of the bin and having a sieve, a rotary stirring device comprising a tapering body mounted on and conforming to the configuration of the bin, upwardly-converging stirrer-arms 25 arranged within the bin and provided at their upper terminals with a bearing, the lower stirrer-arms operating on the sieve, the vertical rod or bolt 28 passing through the said bearing and the supporting frame or spider and connected with the lower portion of the stirring device, and means for operating the stirring device, substantially as described.

In testimony that I claim the foregoing as my own I have hereto affixed my signature in the presence of two witnesses.

ORELLA LOCKE.

Witnesses:
  T. BLANCETT,
  ALICE BLANCETT.